(12) United States Patent (10) Patent No.: US 12,636,992 B2
Seok et al. (45) Date of Patent: May 26, 2026

(54) MOBILITY DEVICE AND A CONTROL METHOD THEREOF

(71) Applicants: HYUNDAI MOTOR COMPANY, Seoul (KR); KIA CORPORATION, Seoul (KR)

(72) Inventors: Donghee Seok, Seoul (KR); HeeJin Ro, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 511 days.

(21) Appl. No.: 18/224,147

(22) Filed: Jul. 20, 2023

(65) Prior Publication Data

US 2024/0123890 A1 Apr. 18, 2024

(30) Foreign Application Priority Data

Oct. 18, 2022 (KR) ........................ 10-2022-0134179

(51) Int. Cl.
B60P 1/52 (2006.01)
B65G 13/06 (2006.01)
(52) U.S. Cl.
CPC ................ B60P 1/52 (2013.01); B65G 13/06 (2013.01); B65G 2203/042 (2013.01)
(58) Field of Classification Search
CPC .................................... B60P 1/52; B65G 13/06
See application file for complete search history.

(56) References Cited

U.S. PATENT DOCUMENTS

| | | | | |
|---|---|---|---|---|
| 4,036,345 A * | 7/1977 | Webb | ....................... | B65G 7/02 193/35 MD |
| 4,909,378 A * | 3/1990 | Webb | ........................ | B60P 1/52 414/528 |
| 6,315,109 B1 * | 11/2001 | Dean | ......................... | B60P 1/52 198/786 |
| 6,622,846 B1 * | 9/2003 | Dean | ...................... | B65G 69/24 198/370.09 |
| 9,878,851 B1 * | 1/2018 | Wilkins | ................. | B65G 29/00 |
| 10,486,915 B2 * | 11/2019 | Kim | ....................... | B65G 43/10 |
| 10,518,975 B2 * | 12/2019 | Itoh | ........................ | B65G 43/00 |
| 11,752,914 B1 * | 9/2023 | Biagi | .................... | B60P 1/6418 414/495 |

(Continued)

FOREIGN PATENT DOCUMENTS

| | | |
|---|---|---|
| CN | 106004612 A | 10/2016 |
| CN | 107264376 A | 10/2017 |

(Continued)

*Primary Examiner* — Jonathan Snelting
(74) *Attorney, Agent, or Firm* — Lempia Summerfield Katz LLC

(57) ABSTRACT

A mobility device includes a conveyor device in which a plurality of rotating bodies whose rotational direction, torque, and angle are controlled is arranged to form a plane and a freight is loaded on the plurality of rotating bodies. The mobility device also includes a user interface provided to input a movement command for moving the freight. The mobility device additionally includes a controller connected to enable wireless communication with the user interface. The controller is configured to control the plurality of rotating bodies to move the freight loaded on the conveyor device based on the movement command.

23 Claims, 10 Drawing Sheets

(56) References Cited

U.S. PATENT DOCUMENTS

| | | | | |
|---|---|---|---|---|
| 12,008,507 | B2 * | 6/2024 | Hong ......................... | B60P 1/52 |
| 12,480,561 | B2 * | 11/2025 | Seok ......................... | B60P 1/52 |
| 2017/0291766 | A1 | 10/2017 | Orth et al. | |
| 2020/0354171 | A1 * | 11/2020 | Vincent ................. | B65G 67/24 |

FOREIGN PATENT DOCUMENTS

| | | | |
|---|---|---|---|
| JP | 2019112226 | A | 7/2019 |
| KR | 101107008 | B1 | 1/2012 |
| KR | 20180027102 | A | 3/2018 |
| KR | 20210008675 | A | 1/2021 |
| KR | 102350342 | B1 | 1/2022 |

* cited by examiner

<CONTROL BY SMART PACKAGE CONTROLLER (510)>

<CONTROL BY PACKAGE CONTROL PANELS (540, 570)>

<CONTROL BY SMART PACKAGE CONTROLLER (510)>

<CONTROL BY CONVEYOR CONTROLLER (520)>

MOBILITY DEVICE AND A CONTROL METHOD THEREOF

CROSS-REFERENCE TO RELATED APPLICATION(S)

This application claims the benefit of and priority to Korean Patent Application No. 10-2022-0134179, filed on Oct. 18, 2022, the entire contents of which are incorporated herein by reference.

TECHNICAL FIELD

The present disclosure relates to a mobility device, and more particularly, to freight transportation using a mobility device.

BACKGROUND

Vehicles of various specifications for transporting freight, such as logistics mobility devices, are often utilized to transport various freights. In the utilization of logistics mobility devices, the efficiency of logistics is very important. In the case of delivering freights to multiple delivery destinations, because freights from nearby delivery destinations and freights from distant delivery destinations may be mixed, it is difficult and often takes a long time to take out a particular freight.

SUMMARY

An aspect of the present disclosure provides a mobility device capable of more quickly and conveniently moving freights loaded into a loading box within the loading box.

Additional aspects of the present disclosure are set forth in part in the description which follows and, in part, should be apparent from the description, or may be learned by practice of the present disclosure.

In accordance with an embodiment of the present disclosure, a mobility device is provided. The mobility device includes a conveyor device in which a plurality of rotating bodies whose rotational direction, torque, and angle are controlled is arranged to form a plane and a freight is loaded on the plurality of rotating bodies. The mobility device also includes a user interface provided to input a movement command for moving the freight. The mobility device additionally includes a controller connected to enable wireless communication with the user interface. The controller is configured to control the plurality of rotating bodies to move the freight loaded on the conveyor device based on the movement command.

In an aspect, the controller is configured to detect the loading of a new freight or the unloading of an existing freight on the conveyor device from a change in pressure applied to the plurality of rotating bodies, and update a freight list to reflect the loading of the new freight or the unloading of the existing freight.

In an aspect, the controller is configured to determine that the new freight is loaded on the conveyor device when the change in pressure applied to the plurality of rotating bodies is pressurization.

In an aspect, the controller is configured to determine that the existing freight is unloaded from the conveyor device when the change in pressure applied to the plurality of rotating bodies is decompression.

In an aspect, the user interface is configured to receive a movement command of the freight from a user for the updated freight list, and transmit the received movement command of the freight to the controller.

In an aspect, the movement command of the freight may include a designation of the freight to be moved and a destination to which the designated freight is to be moved.

In an aspect, the rotational direction, torque, and angle of the plurality of rotating bodies of the conveyor device may be controlled such that the designated freight is moved to the destination.

In an aspect, the control of the plurality of rotating bodies comprises control of the rotational direction, torque, and angle of the plurality of rotating bodies.

In accordance with another embodiment of the present disclosure, a control method of a mobility device including a conveyor device in which a plurality of rotating bodies whose rotational direction, torque, and angle are controlled is arranged to form a plane and a freight is loaded on the plurality of rotating bodies is provided. The control method includes receiving a movement command for moving the freight through a user interface. The control method also includes controlling the plurality of rotating bodies to move the freight loaded on the conveyor device based on the movement command in response to the movement command received through the user interface.

In an aspect, the control method may further include detecting the loading of a new freight or the unloading of an existing freight on the conveyor device from a change in pressure applied to the plurality of rotating bodies, and updating a freight list to reflect the loading of the new freight or the unloading of the existing freight.

In an aspect, the control method may further include determining that the new freight is loaded on the conveyor device when the change in pressure applied to the plurality of rotating bodies is pressurization.

In an aspect, the control method may further include determining that the existing freight is unloaded from the conveyor device when the change in pressure applied to the plurality of rotating bodies is decompression.

In an aspect, the control method may further include receiving a movement command of the freight from a user for the updated freight list, and transmitting the received movement command of the freight.

In an aspect, the movement command of the freight may include a designation of the freight to be moved and a destination to which the designated freight is to be moved.

In an aspect, the rotational direction, torque, and angle of the plurality of rotating bodies of the conveyor device may be controlled such that the designated freight is moved to the destination.

In an aspect, the control of the plurality of rotating bodies may be to control the rotational direction, torque, and angle of the plurality of rotating bodies.

In accordance with yet another embodiment of the present disclosure, a mobility device is provided. The mobility device includes a conveyor device in which a plurality of rotating bodies whose rotational direction, torque, and angle are controlled is arranged to form a plane and a freight is loaded on the plurality of rotating bodies. The mobility device also includes a user interface configured to display the conveyor device and the freight loaded on the conveyor device on a display and to generate a movement command for moving the freight through a touch input of the display. The mobility device further includes a controller connected to enable communication with the user interface. The controller is configured to control the plurality of rotating bodies to move the freight loaded on the conveyor device based on the movement command.

In an aspect, the touch input may be to drag between a current location of the freight and a destination location.

In an aspect, when the movement of the freight according to the movement command of the freight is completed, contents displayed on the display may be updated to reflect a changed location of the freight.

In an aspect, the user interface may be provided in a boarding space of the mobility device.

In an aspect, the user interface may be provided on a door of a loading box of the mobility device.

In an aspect, the user interface may be a portable user interface provided to be carried by a user.

In an aspect, the control of the plurality of rotating bodies may be to control the rotational direction, torque, and angle of the plurality of rotating bodies.

BRIEF DESCRIPTION OF THE DRAWINGS

These and/or other aspects of the present disclosure should become apparent and more readily appreciated from the following description of the embodiments, taken in conjunction with the accompanying drawings in which:

FIG. 6 is a diagram illustrating a process of determining a freight state performed by a smart package controller of the mobility device according to an embodiment of the present disclosure;

DETAILED DESCRIPTION

Figure 1:
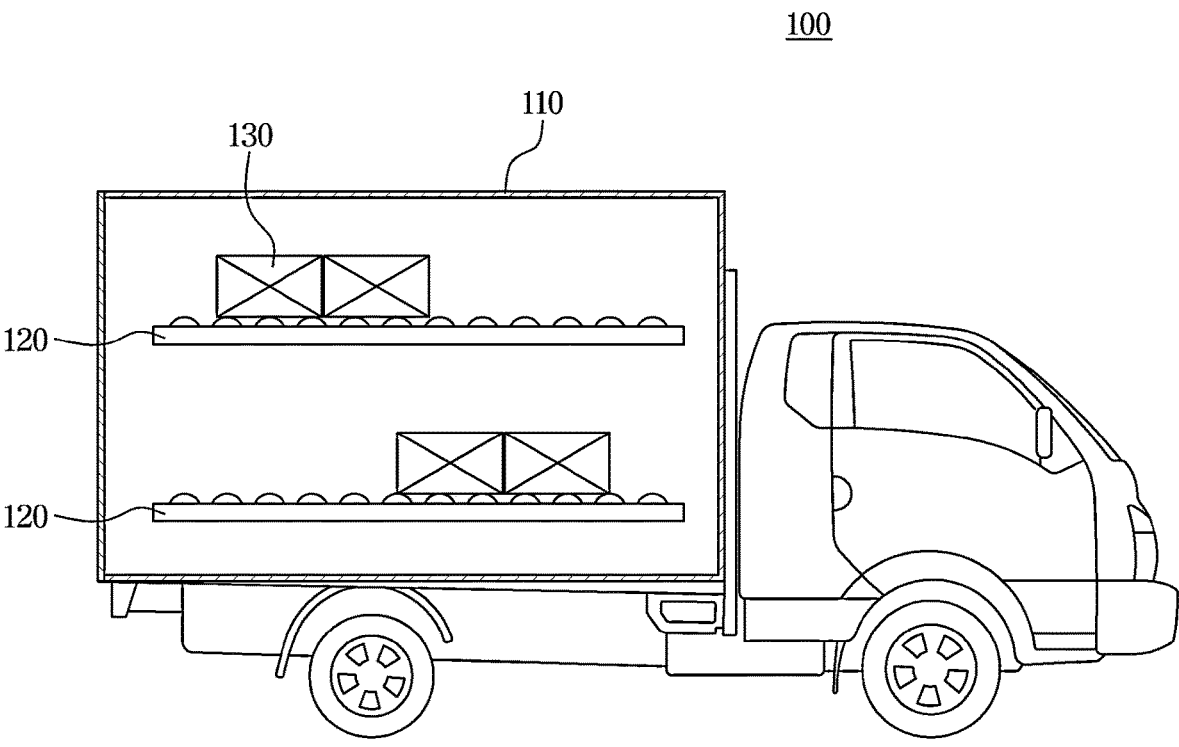
FIG. 1 is a view illustrating a mobility device, according to an embodiment of the present disclosure.

Throughout the specification, like reference numerals refer to like components. This specification does not describe all factors of embodiments. Duplicative contents between general contents or embodiments in the technical field of the present disclosure have been omitted. The terms 'part,' 'module,' 'member,' and 'device' used in this specification may be embodied as software or hardware, and it is also possible for a plurality of 'parts,' 'modules,' 'members;

and 'devices' to be embodied as one component, or one part,' 'module,' 'member,' and 'device' to include a plurality of components according to the embodiments.

Throughout the specification, when a part is referred to as being "connected" to another part, this includes not only a direct connection but also an indirect connection, and the indirect connection includes connecting through a wireless network.

When it is described that a part "includes" a component, this means that the may further include other components, not excluding the other components unless specifically stated otherwise.

Throughout the specification, when a component is referred to as being located "on" or "over" another component, this includes not only a case in which a component is in contact with another component but also a case in which another component exists between the two components.

The terms 'first,' 'second,' etc. are used to distinguish one component from another component, and the components are not limited by the above-mentioned terms.

The singular forms "a," "an," and "the" include plural referents unless the context dearly dictates otherwise.

In each step, an identification numeral is used for convenience of explanation, the identification numeral does not describe the order of the steps, and each step may be performed differently from the order specified unless the context clearly states a particular order.

When a component, device, element, or the like of the present disclosure is described as having a purpose or performing an operation, function, or the like, the component, device, or element should be considered herein as being "configured to" meet that purpose or perform that operation or function.

Hereinafter, operation principles and embodiments of the present disclosure are described with reference to the accompanying drawings.

A user terminal (e.g., a portable package control panel) may be implemented as a computer or a portable terminal capable of accessing a mobility device through a network. The computer may include, for example, a notebook, a desktop, a laptop, a tablet PC, a slate PC, or the like, on which a WEB Browser is installed. The portable terminal, such as a wireless communication device that allows portability and mobility, may include various kinds of handheld based wireless communication devices, for example, such as a Personal Communication System (PCS), a Global System for Mobile communications (GSM), a Personal Digital Cellular (PDC), a Personal Handyphone System (PHS), a Personal Digital Assistant (PDA), an International Mobile Telecommunication-2000 (IMT-2000), a Code Division Multiple Access-2000 (CDMA-2000), a W-Code Division Multiple Access W-CDMA), an Wireless Broadband Internet (WiBro) terminal, or a smart phone, or a wearable device such as a watch, a ring, a bracelet, an anklet, a necklace, a pair of glasses, a contact lens, and a head-mounted-device (HMD).

FIG. 1 is a view illustrating a mobility device according to an embodiment of the present disclosure.

As illustrated in FIG. 1, a mobility device 100 according to an embodiment of the present disclosure includes a loading box 110. At least one conveyor device 120 may be installed in the loading box 110. A plurality of the conveyor devices 120 may be installed to form layers in order to load more freights 130 in the loading box 110. Within the loading box 110, the freights 130 may be loaded for each of the conveyor devices 120.

Figure 2:
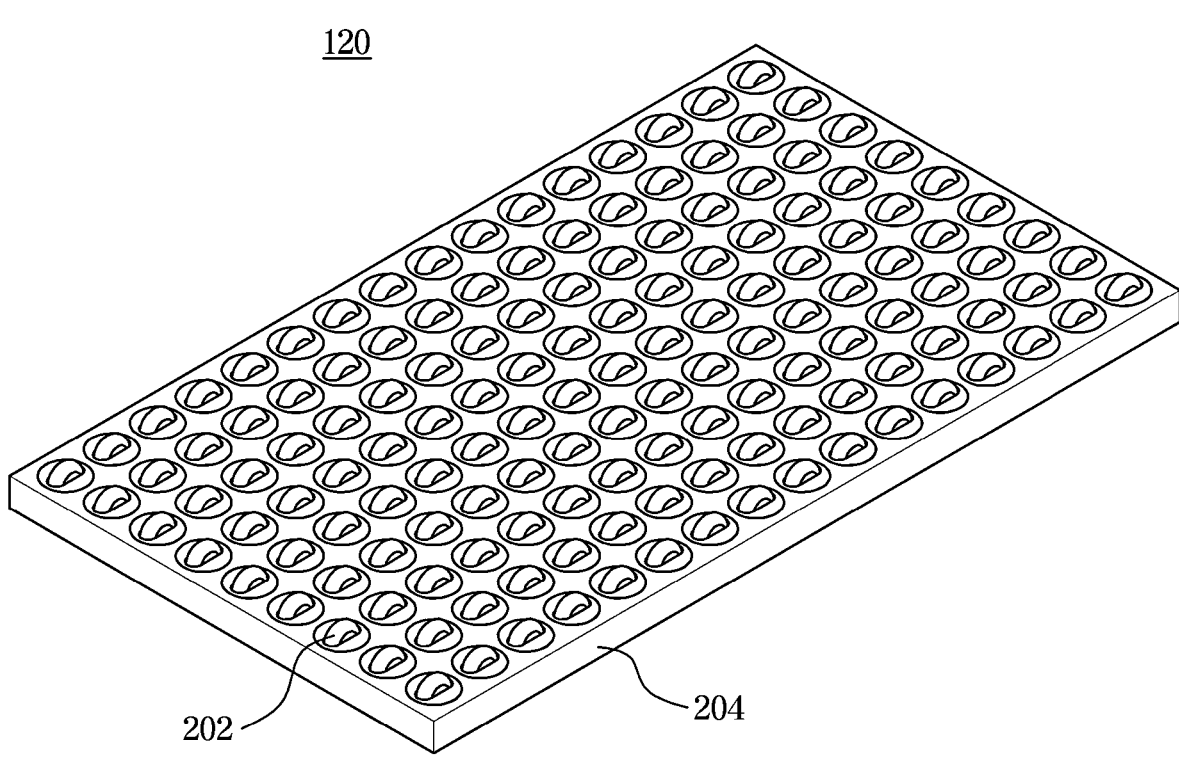
FIG. 2 is a view illustrating a conveyor device illustrated in FIG. 1, according to an embodiment of the present disclosure.

FIG. 2 is a view illustrating a conveyor device illustrated in FIG. 1, according to an embodiment of the present disclosure.

As illustrated in FIG. 2, the conveyor device 120 may be installed such that a plurality of wheels 202 forms a grid arrangement on a frame 204 having a plate shape. Each of the plurality of wheels 202 may be installed to be rotatable. Rotation of each of the plurality of wheels 202 is be described in detail below with reference to FIGS. 3 and 4.

Figure 3:
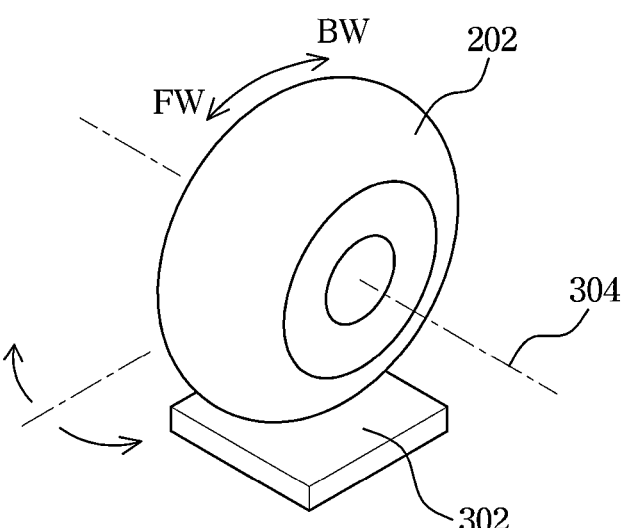
FIG. 3 is a view illustrating a structure of a wheel of the conveyor device illustrated in FIG. 2, according to an embodiment of the present disclosure.

FIG. 3 is a view illustrating a structure of the wheel of the conveyor device illustrated in FIG. 2, according to an embodiment of the present disclosure.

As illustrated in FIG. 3, each of the plurality of wheels 202 of the conveyor device 120 may rotate along an axis of rotation 304. The rotation of the wheel 202 may be forward rotation (FW) and/or reverse rotation (BW). A rotational direction of the wheel 202 of the conveyor device 120 may be formed through a motor (not shown). Torque when the wheel 202 rotates may be controlled through torque control of the motor (not shown). The torque of the wheel 202 may be adjusted to increase or decrease as needed.

An angle of each of the plurality of wheels 202 of the conveyor device 120 may be controlled. The angle of the wheel 202 may be controlled to the left and right within a predetermined range with respect to a reference direction A0. The angle of the wheel 202 of the conveyor device 120 may be formed through the motor (not shown).

The rotational direction and angle of the wheel 202 are controlled by a conveyor controller. An example conveyor controller 520, according to an embodiment, is described below with reference to FIG. 5. Each of the plurality of wheels 202 may include a wheel sensor unit 302. A load sensor (not shown) and a communication device (not shown) may be provided in the wheel sensor unit 302. The load sensor may be provided to measure a load (pressure) applied to the wheel 202. A weight of the freight 130 located on the wheel 202 may be measured by the load sensor. The load (pressure) measured by the load sensor may be transmitted to the conveyor controller 520 through the communication device.

As each of the plurality of wheels 202 provided in the conveyor device 120 is installed to form the grid arrangement, unique coordinates (location information) may be assigned to each of the wheels 202. Accordingly, a position of the corresponding wheel 202 in the conveyor device 120 may be identified by these coordinates. In addition, a position of the freight 130 placed on the corresponding wheel 202 may be identified by the location information of each of the plurality of wheels 202.

The plurality of wheels 202 of the conveyor device 120 is an example of a plurality of rotating bodies (i.e., objects that rotate). In some embodiments, the shape of the wheel 202 described above may be replaced with another shape as long as it is a rotating body capable of controlling the rotational direction, torque, and angle, such as a sphere shape or a roller shape.

Figure 4:
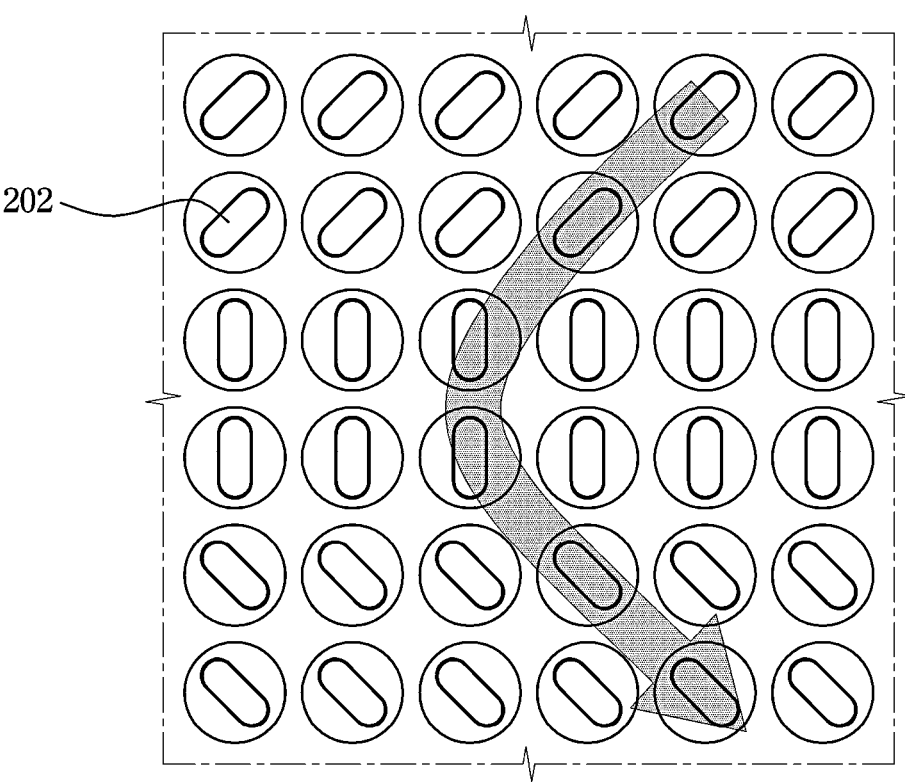
FIG. 4 is a view illustrating an independent direction conversion of the wheels of the conveyor device illustrated in FIG. 3, according to an embodiment of the present disclosure.

FIG. 4 is a view illustrating an independent direction conversion of the wheels of the conveyor device illustrated in FIG. 3, according to an embodiment of the present disclosure.

As described above with reference to FIG. 3, the angle of each of the plurality of wheels 202 of the conveyor device 120 may be controlled. Through such angle control of each of the plurality of wheels 202, as indicated by an arrow in FIG. 4, a moving direction of a freight placed on the conveyor device 120 may be freely changed.

Figure 5:
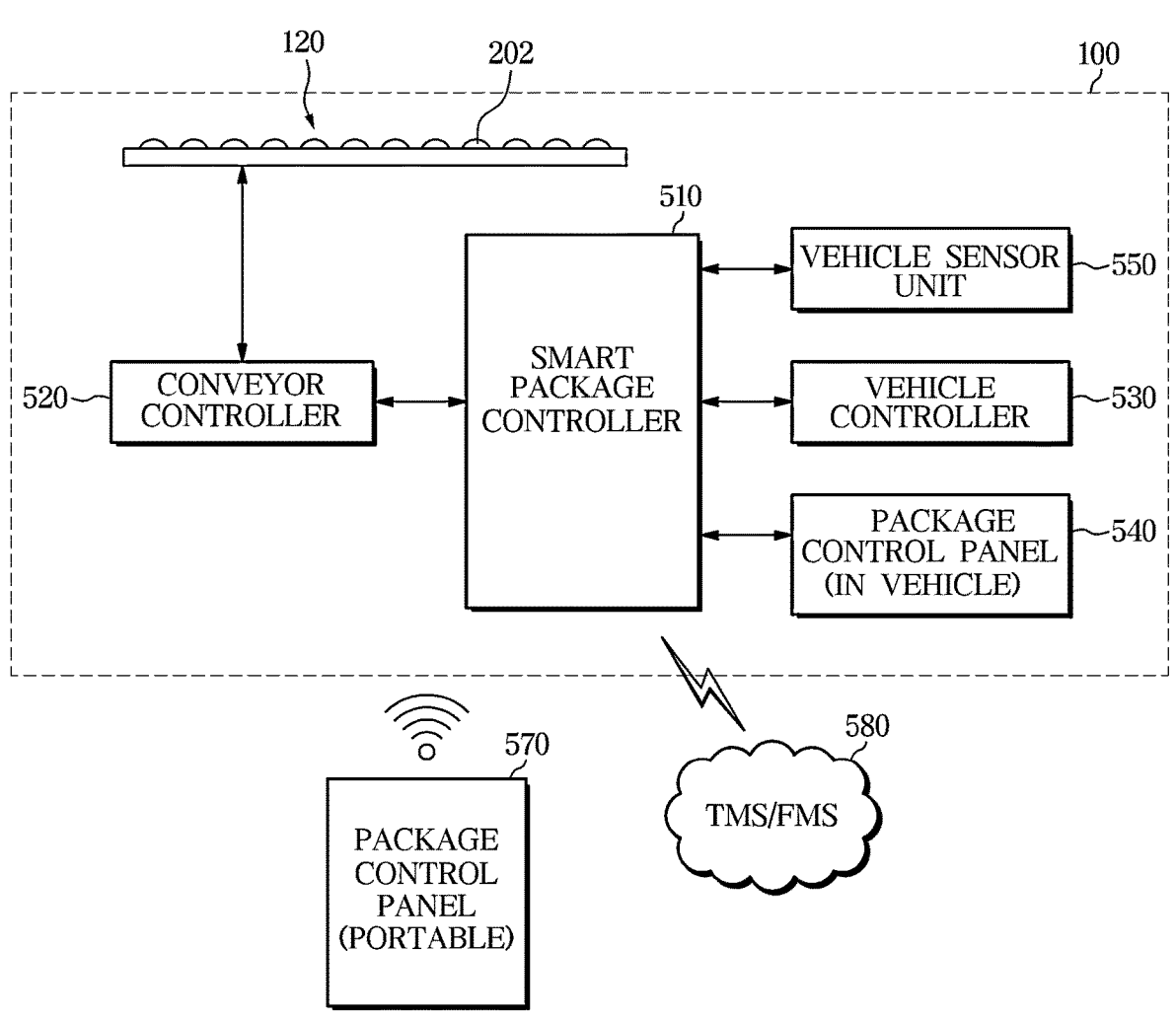
FIG. 5 is a diagram illustrating a control system of a mobility device according to an embodiment of the present disclosure.

FIG. 5 is a diagram illustrating a control system of the mobility device for logistics according to an embodiment of the present disclosure.

As illustrated in FIG. 5, via a smart package controller 510, the conveyor controller 520, the conveyor device 120, a vehicle controller 530, an in-vehicle package control panel 540, a vehicle sensor unit 550, and a portable package control panel 570 may be connected to enable communication.

The smart package controller (SPC) 510, which may be an upper controller of the conveyor controller 520, may control the rotational direction, torque, and angle of each of the plurality of wheels 202 of the conveyor device 120 through the conveyor controller 520. In order to control the rotational direction, torque, and angle of each of the plurality of wheels 202, the smart package controller 510 may receive data or commands from the vehicle controller 530 and the package control panels 540 and 570, and may receive detection values (data) from the vehicle sensor unit 550. The smart package controller 510 may have an IoT communication function for communication with the portable package control panel (portable) 570. In addition, the smart package controller 510 may be linked with a cloud service 580 to receive traffic information (traffic management system information) and facility-related information (facility management system information) from the cloud service 580. The smart package controller 510 may also exchange data in conjunction with other controllers of the mobility device 100.

The package control panels (PCP) 540 and 570, as an example of a user interface, may receive information related to freights loaded in the loading box 110 of the mobility device 100 from the smart package controller 510 and transmit the received information to the smart package controller 510. The information related to the loaded freights may be information such as loading locations, quantity, and loads of the freights. A control command related to a freight may be a command for moving the freight from a current location to another target location. In an embodiment, the package control panels 540 and 570 may include a graphical user interface (GUI). The package control panels 540 and 570 may include the in-vehicle package control panel 540 and the portable package control panel 570. The in-vehicle package control panel 540 may be provided in the form of an in-vehicle infotainment (IVI) in the boarding space of the mobility device 100, or may be provided in the form of a wall pad on a loading box door of the mobility device 100. The in-vehicle package control panel 540 may communicate with the smart package controller 510 through an in-vehicle wired communication network. The portable package control panel 570 may generally have the same function as the in-vehicle package control panel 540, but may not be fixed to the mobility device 100 and thus may be carried by a user. The portable package control panel 570 may be provided in the form of an application installed on a mobile phone (e.g., a smart phone). The portable package control panel 570 may communicate with the smart package controller 510 through a wireless communication network.

The conveyor controller 520 may communicate with the conveyor device 120 to obtain state information of each of the plurality of wheels 202 of the conveyor device 120, and may transfer the obtained state information of each of the plurality of wheels 202 to the smart package controller 510. The state information of each of the plurality of wheels 202 of the conveyor device 120 obtained by the conveyor controller 520 may include the location information (coordinates), rotational direction, rotation torque, and angle of each of the plurality of wheels 202. The smart package controller 510 may transmit a control signal for controlling the rotational direction, rotation torque, and angle of each of the plurality of wheels 202 of the conveyor device 120 to the conveyor controller 520, so that the conveyor controller 520 controls the rotational direction, rotation torque, and angle of each of the plurality of wheels 202 according to the received control signal.

The vehicle sensor unit 550 may include various sensors installed in the mobility device 100. For example, the vehicle sensor unit 550 may include a vehicle speed sensor (not shown) and a gyro sensor (not shown). The vehicle speed sensor may measure a speed of the mobility device 100. The gyro sensor may measure rapid acceleration or rapid deceleration of the mobility device for logistics 100. The gyro sensor may also measure an inclination of the loading box 110 of the mobility device for logistics 100. The vehicle sensor unit 550 may also include a GPS receiver (not shown) installed in the mobility device for logistics 100. The smart package controller 510 may obtain location information of the mobility device for logistics 100 through the GPS receiver.

The cloud service (TMS) (FMS) 580 may provide information related to a traffic management system (TMS)/facility management system (FMS) to the smart package controller 510 through wireless communication with the smart package controller 510 of the mobility device for logistics 100. The TMS/FMS-related information provided by the cloud service 580 may include road information such as an inclined section, an unpaved section, a construction section, or the like on a driving route linked to a current location of the mobility device for logistics 100, a set guide route, or the like.

The controller may be implemented as a memory (not shown) for storing an algorithm for controlling operations of components in the mobility device for logistics or data for a program reproducing the algorithm and a processor (not shown) for performing the above-described operations using data stored in the memory. In various embodiments, the memory and the processor may be implemented as separate chips or may be implemented as a single chip.

The communication device may include one or more components that enable communication with an external device. For example, the communication device may include at least one of a short-range communication module, a wired communication module, or a wireless communication module, or a combination thereof.

The short-range communication module may include various short-range communication modules that transmit and receive signals using a wireless communication network in a short distance such as a Bluetooth module, an infrared communication module, a radio frequency identification (RHO) communication module, a wireless local access network (WLAN) communication module, a near field communication (NFC) module, and/or a Zigbee communication module.

The wired communication module may include various cable communication modules such as a universal serial bus (USB), a high definition multimedia interface (HOW), a digital visual interface (DVI), a recommended standard 232 (RS-232), a power line communication, and a plain old telephone service (POTS), as well as various wired communication modules such as a controller area network (CAN) communication module, a local area network (LAN) module, a wide area network (WAN) module, and/or a value added network (VAN) module.

The wireless communication module, in addition to a Wi-Fi module and a wireless broadband module, may include wireless communication modules that support various wireless communication methods such as a global system for mobile communication (GSM), a code division multiple access (COMA), a wideband code division multiple access (WCDMA), a universal mobile telecommunication system (UMTS), a time division multiple access (TDMA), and Long Term Evolution (LTE).

The wireless communication module may include a wireless communication interface including an antenna and a transmitter for transmitting signals. The wireless communication module may further include a signal conversion module for modulating a digital control signal output from the controller through a wireless communication interface into an analog type wireless signal under the control of the controller.

The wireless communication module may include a wireless communication interface including an antenna and a receiver for receiving signals. The wireless communication module may further include a signal conversion module for demodulating an analog type wireless signal received through a wireless communication interface into a digital control signal.

A storage device may be implemented as at least one of a non-volatile memory device such as a cache, a read only memory (ROM), a programmable ROM (PROM), an erasable programmable ROM (EPROM), an electrically erasable programmable ROM (EEPROM), and a flash memory, a volatile memory device such as a random access memory (RAM), and a storage medium such as a hard disk drive (HDD) and a CD-ROM, but is limited thereto. The storage unit may be the memory implemented as a chip separate from the processor described above in relation to the controller, or may be implemented as a single chip with the processor.

A display device may include a cathode ray tube (CRT), a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel or an organic light emitting diode (OLED) panel, but is not limited thereto.

An input device may include hardware devices such as various buttons or switches, pedals, keyboards, mice, trackballs, various levers, handles, and/or sticks, for a user input.

The input device may also include a graphical user interface (GUI), i.e., a software device, such as a touch pad for a user input. The touch pad may be implemented as a touch screen panel (TSP) to form a mutual layer structure with the display device.

When configured as the touch screen panel (TSP) forming a mutual layer structure with the touch pad, the display device may also be used as the input device.

At least one component corresponding to the performance of the components of the mobility device for logistics illustrated in FIG. 5 may be added or omitted. It should be understood by those having ordinary skill in the art that the mutual positions of the components may be changed corresponding to the performance or structure of the system.

Each of the components illustrated in FIG. 5 may comprise a software component and/or a hardware component such as a field-programmable gate array (FPGA) and an application specific integrated circuit (ASIC).

FIGS. 6 to 9 are diagrams illustrating a control method of the mobility device for logistics according to an embodiment of the present disclosure. The control methods of FIGS. 6 to 9 are connected to 'A', 'B', and 'C', respectively, to form a control method of the mobility device for logistics.

Figure 6:
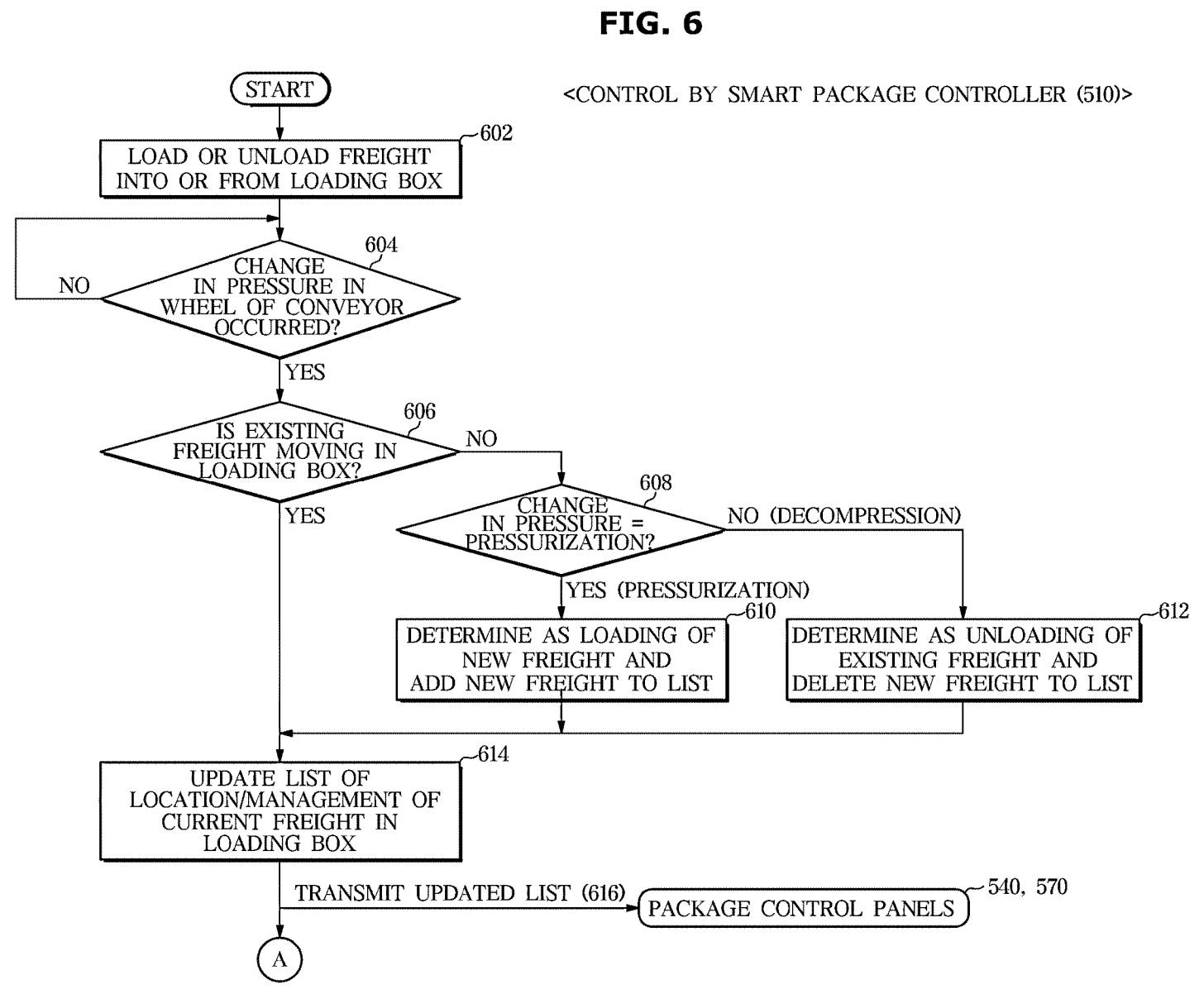

FIG. 6 is a diagram illustrating a process of determining a freight state performed by a smart package controller of the mobility device according to an embodiment of the present disclosure.

As illustrated at a block 602 of FIG. 6, freights may be loaded into or unloaded from the loading box 110 of the mobility device 100 for logistics. For example, a new freight may be loaded into the loading box 110 of the mobility device 100 for logistics, or an existing freight loaded in the loading box 110 of the mobility device 100 for logistics may be unloaded to be drawn out of the loading box 110.

In an operation 604, the smart package controller 510 may monitor whether a change in pressure occurs in at least one of the plurality of wheels 202 of the conveyor device 120. The change in pressure in at least one of the plurality of wheels 202 of the conveyor device 120 may be detected by a load sensor of the wheel sensor unit 302 provided on each of the plurality of wheels 202, and may be transmitted to the smart package controller 510 through the conveyor controller 520.

When a change in pressure occurs in at least one of the plurality of wheels 202 of the conveyor device 120 ('YES' in the operation 604), the smart package controller 510 may, in an operation 606, check whether the existing freight already loaded in the loading box 110 is moving.

When the existing freight already loaded in the loading box 110 is not moving ('NO' in the operation 606), the smart package controller 510 may, in an operation 608, check whether the change in pressure in at least one of the plurality of wheels 202 of the conveyor device 120 is 'pressurization'.

When the change in pressure in at least one of the plurality of wheels 202 of the conveyor device 120 is 'pressurization' ('YES (pressurization' in the operation 608 608), the smart package controller 510 may, in an operation 610, determine that the change in pressure has occurred due to the loading of the new freight in the loading box 110, and add the new freight to a list of the package control panels 540 and 570. In an embodiment, the added list may include an identifier, location information, and weight information of the new freight.

When the change in pressure in at least one of the plurality of wheels 202 of the conveyor device 120 is 'decompression' ('NO (decompression)' in the operation 608), the smart package controller 510 may, in an operation 612, determine that the change in pressure has occurred due to the loading of the new freight, and deletes the existing freight from the list of the package control panels 540 and 570. In an embodiment, the deleted list may include an identifier, location information, and weight information of the existing freight.

Operations 606 to 612 in FIG. 6 may be for checking whether the change in pressure in at least one of the plurality of wheels 202 of the conveyor device 120 is due to the movement of the existing freight in the load box 110 (operation 606), for checking whether the new freight is loaded (operation 610), or the existing freight is unloaded (operation 612).

Whatever the cause of the change in pressure in at least one of the plurality of wheels 202 of the conveyor device 120, the smart package controller 510 may, in an operation 614, update the change in the list of freight according to the change in pressure. In an operation 616, the conveyor device 120 may transmit the updated list to the package control panels 540 and 570. The change in the list of freight may include an identifier, location information, and weight information of the changed freight.

Figure 7:
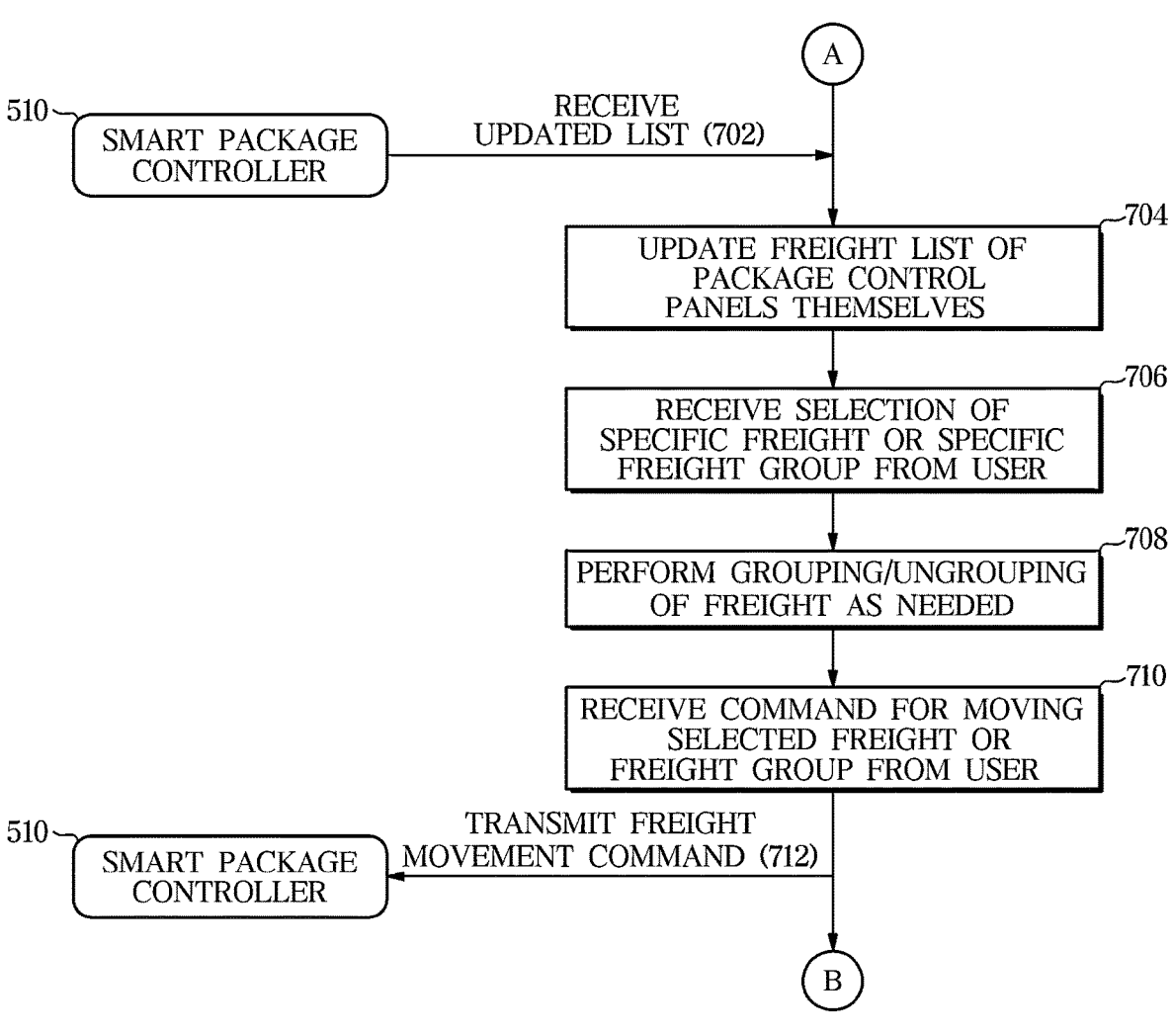
FIG. 7 is a diagram illustrating a process of generating a freight movement command performed by a package control panel of the mobility device according to an embodiment of the present disclosure.

The process after the control method of FIG. 6 may continue with 'A' in FIG. 7.

FIG. 7 is a diagram illustrating a process of generating a freight movement command performed by a package control panel of the mobility device according to an embodiment of the present disclosure. FIG. 7 continues from 'A' in FIG. 6.

As illustrated in FIG. 7, in an operation 702, the package control panels 540 and 570 may receive the updated list, which is transmitted from the smart package controller 510 in process 616 of FIG. 6, in process 702 of FIG. 7.

In an operation 704, the package control panels 540 and 570 may update the freight list of themselves using the received update list. In an embodiment, the updated freight list may include an identifier, location information, and weight information of the changed freight.

In an operation 706, the package control panels 540 and 570 may receive a selection of a specific freight or a specific freight group from a user through a user interface. In an operation 708, the package control panels 540 and 570 may perform grouping or ungrouping of selected freights as needed.

Figure 10:
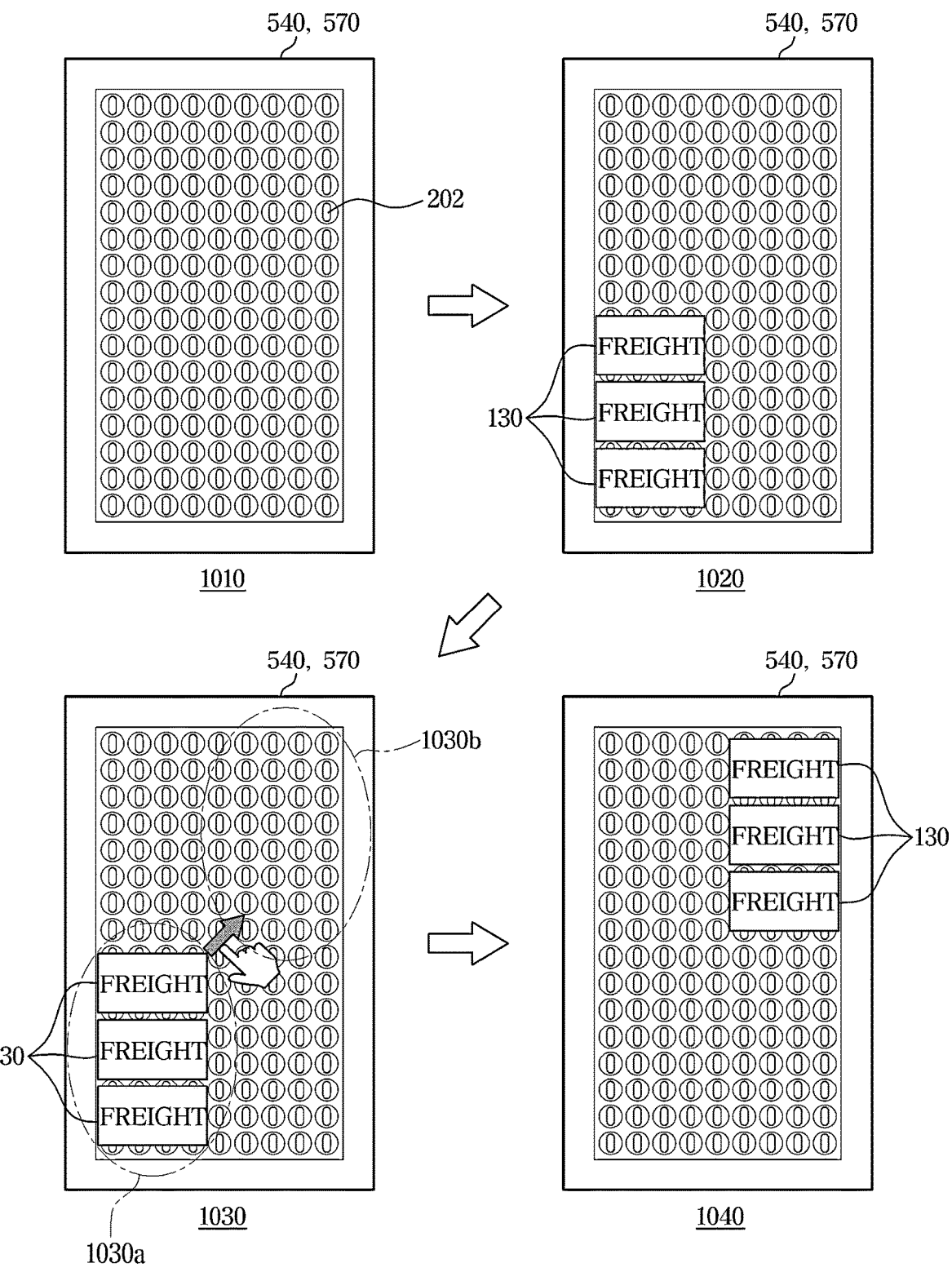
FIG. 10 is a diagram illustrating a graphical user interface of the package control panel according to an embodiment of the present disclosure.

FIG. 10 is a diagram illustrating a graphical user interface of the package control panel according to an embodiment of the present disclosure. A display 1010 in FIG. 10 graphically shows a planar arrangement 1010 of the entirety of the plurality of wheels 202 provided on the conveyor device 120 of the loading box 110 on displays of the package control panels 540 and 570. A display 1020 in FIG. 10 shows the freights 130 loaded at predetermined locations on the conveyor device 120 graphically displayed on the displays of the package control panels 540 and 570. In the display 1020, the freights 130 are in a state in which three individual freights are grouped into one by a selection of the user.

Referring back to FIG. 7, in an operation 710, the package control panel 540 and 570 receive a command for moving a selected freight or freight group from the user. As shown in the display 1020 in FIG. 10, in a state where the three individual freights 130 are grouped into one, when the user drags the grouped freights 130 displayed on user interfaces of the package control panels 540 and 570 from a current location 1030a to a new target location 1030b as shown in a display 1030 in FIG. 10, the package control panels 540 and 570 may recognize (e.g., receive) the dragging action the user as a freight movement command. For example, a movement command for moving the corresponding freight 130 from the current location 1030a to the new target location 1030b by the dragging action of the user may be generated.

A movement command of the freight 130 may be generated by manipulation of another type in addition to or instead of by dragging on the user interfaces of the package control panels 540 and 570. For example, when the current location of the freight 130 is touched and then another target location is touched once more, a movement command may be generated such that the freight 130 at the firstly touched position moves to the secondly touched position.

The generation of the movement command on the user interfaces of the package control panels 540 and 570 may allow the user to quickly and conveniently change the position of the freight 130 in the loading box 110, for example as the user seats on a driver seat of the mobility device 100 for logistics. For example, the freights 130 having the same delivery location may be grouped and classified as one. In addition, by placing the freights 130 closer to a door of the loading box 110 in the order in which the delivery location of the freights 130 is closer to the current location, when the next delivery location arrives, the corresponding freight 130 may be more easily and quickly withdrawn from the loading box 110. In addition, in a case that the loading box 110 is equipped with refrigeration/freezing facilities, a refrigeration/freezing efficiency at a location relatively close to a cold air outlet may be different from a refrigerating/freezing efficiency at a location relatively far from the cold air outlet. Therefore, through the freight movement command according to an embodiment of the present disclosure, the freights in the loading box 110 are alternately circulated between a location relatively close to the cold air outlet and a location relatively far from the cold air outlet, even refrigeration/freezing conditions may be maintained for all of the freights 130.

In an operation 712, the package control panels 540 and 570 may transmit a freight movement command generated by a dragging action of the user to the smart package controller 510.

Figure 8:
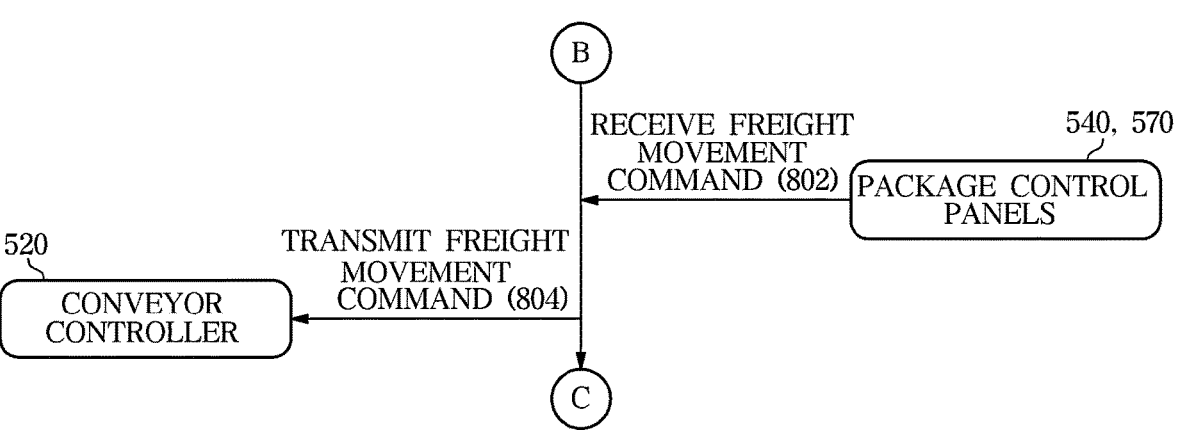
FIG. 8 is a diagram illustrating a process of delivering a freight movement command performed by the smart package controller of the mobility device according to an embodiment of the present disclosure.

The process after the control method of FIG. 7 may continue with 'B' in FIG. 8.

FIG. 8 is a diagram illustrating a process of delivering a freight movement command performed by the smart package controller of the mobility device according to an embodiment of the present disclosure. FIG. 8 may continue from 'B' in FIG. 7.

As illustrated in FIG. 8, in an operation 802, the smart package controller 510 may receive a freight movement command generated, for example, by a dragging action of the user on the user interfaces of the package control panels 540 and 570, In an operation 804, the smart package controller 510 may transmit the received freight movement command to the conveyor controller 520 so that the freight 130 on the conveyor device 120 may be actually moved by the freight movement command.

Figure 9:
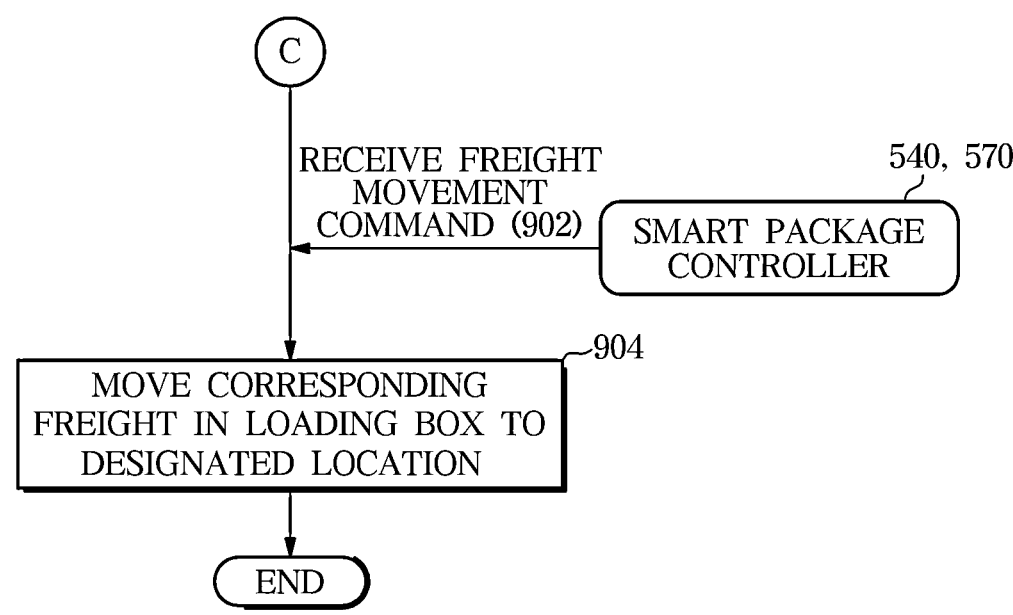
FIG. 9 is a diagram illustrating a process of controlling freight movement performed by a conveyor controller of the mobility device according to an embodiment of the present disclosure.

FIG. 9 is a diagram illustrating a process of controlling freight movement performed by a conveyor controller of the mobility device according to an embodiment of the present disclosure. FIG. 9 may continue from in FIG. 8.

As illustrated in FIG. 9, in an operation 902, the conveyor controller 520 may receive a freight movement command from the smart package controller 510.

In an operation 904, the conveyor controller 520 receiving the freight movement command from the smart package controller 510 may perform control of the plurality of wheels 202 to move the actual freight 130 loaded in the loading box 110 from an actual current location on the conveyor device 120 to an actual destination location on the conveyor device 120 selected by the user, so that the freight 130 is actually moved.

In FIG. 10, a display 1040 shows that the freights 130 are actually moved in response to the freight movement command by the user. The actual moving result of the freights 130 may be graphically displayed on the user interfaces of the package control panels 540 and 570. The user may check that the freights 130 have moved to locations suitable for the intention of the user through graphics displayed on the package control panels 540 and 570.

A mobility device according to an embodiment of the present disclosure can more quickly and conveniently move freights loaded in a loading box within the loading box.

The disclosed embodiments may be implemented in the form of a recording medium storing instructions executable by a computer. The instructions may be stored in the form of program code, and when executed by a processor, a program module may be created to perform the operations of the embodiments. The recording medium may be implemented as a computer-readable recording medium.

The computer-readable recording medium may include any type of recording medium in which instructions readable by the computer are stored. For example, the recording medium may include a read only memory (ROM), a random access memory (RAM), a magnetic tape, a magnetic disk, a flash memory, an optical data storage device, or the like.

The embodiments disclosed with reference to the accompanying drawings have been described above. It should be understood by those having ordinary skill in the art that various changes in form and details may be made therein without departing from the spirit and scope of the present disclosure as defined by the appended claims. The disclosed embodiments are illustrative and should not be construed as limiting.

What is claimed is:

1. A mobility device, comprising:
a conveyor device in which a plurality of rotating bodies whose rotational direction, torque, and angle are controlled is arranged to form a plane and a freight is loaded on the plurality of rotating bodies;
a user interface configured to input a movement command for moving the freight; and
a controller connected to enable wireless communication with the user interface, the controller configured to control the plurality of rotating bodies to move the freight loaded on the conveyor device based on the movement command.

2. The mobility device according to claim 1, wherein the controller is configured to:
detect loading of a new freight or unloading of an existing freight on the conveyor device from a change in pressure applied to the plurality of rotating bodies, and
update a freight list to reflect the loading of the new freight or the unloading of the existing freight.

3. The mobility device according to claim 2, wherein the controller is configured to determine that the new freight is loaded on the conveyor device when the change in pressure applied to the plurality of rotating bodies is pressurization.

4. The mobility device according to claim 2, wherein the controller is configured to determine that the existing freight is unloaded from the conveyor device when the change in pressure applied to the plurality of rotating bodies is decompression.

5. The mobility device according to claim 2, wherein the user interface is configured to:
receive a movement command of the freight from a user for the updated freight list, and
transmit the received movement command of the freight to the controller.

6. The mobility device according to claim 5, wherein the movement command of the freight comprises a designation of the freight to be moved and a destination to which a designated freight is to be moved.

7. The mobility device according to claim 6, wherein the rotational direction, torque, and angle of the plurality of rotating bodies of the conveyor device are controlled such that the designated freight is moved to the destination.

8. The mobility device according to claim 1, wherein the control of the plurality of rotating bodies comprises control of the rotational direction, torque, and angle of the plurality of rotating bodies.

9. A control method of a mobility device comprising a conveyor device in which a plurality of rotating bodies whose rotational direction, torque, and angle are controlled is arranged to form a plane and a freight is loaded on the plurality of rotating bodies, the control method comprising:

receiving a movement command for moving the freight through a user interface; and controlling the plurality of rotating bodies to move the freight loaded on the conveyor device based on the movement command in response to the movement command received through the user interface.

10. The control method according to claim 9, further comprising:

detecting loading of a new freight or unloading of an existing freight on the conveyor device from a change in pressure applied to the plurality of rotating bodies; and updating a freight list to reflect the loading of the new freight or the unloading of the existing freight.

11. The control method according to claim 10, further comprising determining that the new freight is loaded on the conveyor device when the change in pressure applied to the plurality of rotating bodies is pressurization.

12. The control method according to claim 10, further comprising determining that the existing freight is unloaded from the conveyor device when the change in pressure applied to the plurality of rotating bodies is decompression.

13. The control method according to claim 10, further comprising:

receiving a movement command of the freight from a user for the updated freight list; and transmitting the received movement command of the freight.

14. The control method according to claim 13, wherein the movement command of the freight comprises a designation of the freight to be moved and a destination to which a designated freight is to be moved.

15. The control method according to claim 14, wherein the rotational direction, torque, and angle of the plurality of rotating bodies of the conveyor device are controlled such that the designated freight is moved to the destination.

16. The control method according to claim 9, wherein the control of the plurality of rotating bodies is to control the rotational direction, torque, and angle of the plurality of rotating bodies.

17. A mobility device, comprising:

a conveyor device in which a plurality of rotating bodies whose rotational direction, torque, and angle are controlled is arranged to form a plane and a freight is loaded on the plurality of rotating bodies;

a user interface configured to display the conveyor device and the freight loaded on the conveyor device on a display and to generate a movement command for moving the freight through a touch input of the display; and a controller connected to enable communication with the user interface, the controller configured to control the plurality of rotating bodies to move the freight loaded on the conveyor device based on the movement command.

18. The mobility device according to claim 17, wherein the touch input is to drag between a current location of the freight and a destination location.

19. The mobility device according to claim 17, wherein, when the movement of the freight according to the movement command of the freight is completed, contents displayed on the display are updated to reflect a changed location of the freight.

20. The mobility device according to claim 17, wherein the user interface is provided in a boarding space of the mobility device.

21. The mobility device according to claim 17, wherein the user interface is provided on a door of a loading box of the mobility device.

22. The mobility device according to claim 17, wherein the user interface is a portable user interface provided to be carried by a user.

23. The mobility device according to claim 17, wherein the control of the plurality of rotating bodies is to control the rotational direction, torque, and angle of the plurality of rotating bodies.

* * * * *